United States Patent [19]
Ong et al.

[11] Patent Number: 5,889,511
[45] Date of Patent: Mar. 30, 1999

[54] METHOD AND SYSTEM FOR NOISE REDUCTION FOR DIGITIZING DEVICES

[75] Inventors: Eng Yue Ong; Swee Hock Alvin Lim; Xia Geng, all of Singapore, Singapore

[73] Assignee: Tritech Microelectronics International, Ltd., Singapore, Singapore

[21] Appl. No.: 785,629

[22] Filed: Jan. 17, 1997

[51] Int. Cl.[6] .................................................. G09G 5/00
[52] U.S. Cl. .......................................... 345/173; 345/174
[58] Field of Search ................................. 345/156, 157, 345/173, 174, 175; 178/18, 19

[56] References Cited

U.S. PATENT DOCUMENTS

| | | | |
|---|---|---|---|
| 4,193,118 | 3/1980 | Nash et al. | 364/734 |
| 5,287,119 | 2/1994 | Drumm | 345/158 |
| 5,327,161 | 7/1994 | Logan et al. | 345/157 |
| 5,376,946 | 12/1994 | Mikan | 345/157 |
| 5,488,204 | 1/1996 | Mead et al. | 178/18 |
| 5,543,590 | 8/1996 | Gillespie et al. | 178/18 |
| 5,543,591 | 8/1996 | Gillespie et al. | 178/18 |

*Primary Examiner*—Matthew Luu
*Attorney, Agent, or Firm*—George O. Saile; Stephen B. Ackerman; Bill Knowles

[57] ABSTRACT

Systems and methods for the detection of motions of a pointed object upon a writing surface such as a touchpad are disclosed. The motions will be detected and converted in an analog-to-digital converter to digital codes representing the location of the pointed object upon the touchpad. The motion will be translated into a pen detect signal indicating the presence of the pointed object upon the touchpad. The digital codes will be filtered to minimize noise and formed into a filtered absolute coordinates digital code. The filtered absolute coordinate digital code and the pen detect signal will be converted to a touchpad-computer interface protocol and transferred to a computer system for further processing.

24 Claims, 8 Drawing Sheets

FIG. 4 they will control the display

METHOD AND SYSTEM FOR NOISE REDUCTION FOR DIGITIZING DEVICES

TMI96-012,
  Title: A Command Set For Touchpad Pen-input Mouse,
  Ser. No.: 08/785,726, Filing Date: Jan. 17, 1997,
  Assigned to the Same Assignee as the present invention.
TMI96-013,
  Title: A Touchpad Pen-input Controller,
  Ser. No.: 08/785,738, Filing Date: Jan. 17, 1997,
  Assigned to the Same Assignee as the present invention.
TMI96-014,
  Title: A Touchpad Mouse Controller,
  Ser. No.: 08/785,724, Filing Date: Jan. 17, 1997,
  Assigned to the Same Assignee as the present invention.
TMI96-015
  Title: A Touchpad, Pen-Input and Mouse Controller,
  Ser. No.: 08/785,739, Filing Date: Jan. 17, 1997,
  Assigned to the Same Assignee as the present invention.
TMI96-020, Inventors:
  Title: Automatic Cursor Motion Control for Touchpad Mouse,
  Ser. No.: 08/815,033, Filing Date: Mar. 14, 1997,
  Assigned to the Same Assignee as the present invention.
TMI96-021,
  Title: Multiplexed Analog-to-Digital Converter For Absolute and Relative Voltage Measurements,
  Ser. No.: 08/785,735, Filing Date: Jan. 17, 1997,
  Now issued as U.S. Pat. No. 5,736,949, Issue Date Apr. 7, 1998
  Assigned to the Same Assignee as the present invention.

BACKGROUND OF THE INVENTION

1. Field of the Invention

The present invention relates to computer system input devices such as a digitizers referred to as touchpads and more particularly to the systems and methods necessary to acquire signals from such input devices, to condition the acquired signals to eliminate noise, and to convert the acquired and conditioned signals to digital codes that are transmitted to a computer system.

2. Description of Related Art

Touchpads are small digitizer based devices that allow a person to write or draw upon the surface of the touchpad and have the signals and codes from a controller to be interpreted by a computer system. The touch pad digitizers may be of three types, capacitive, resistive and electromagnetic.

Figure 1:
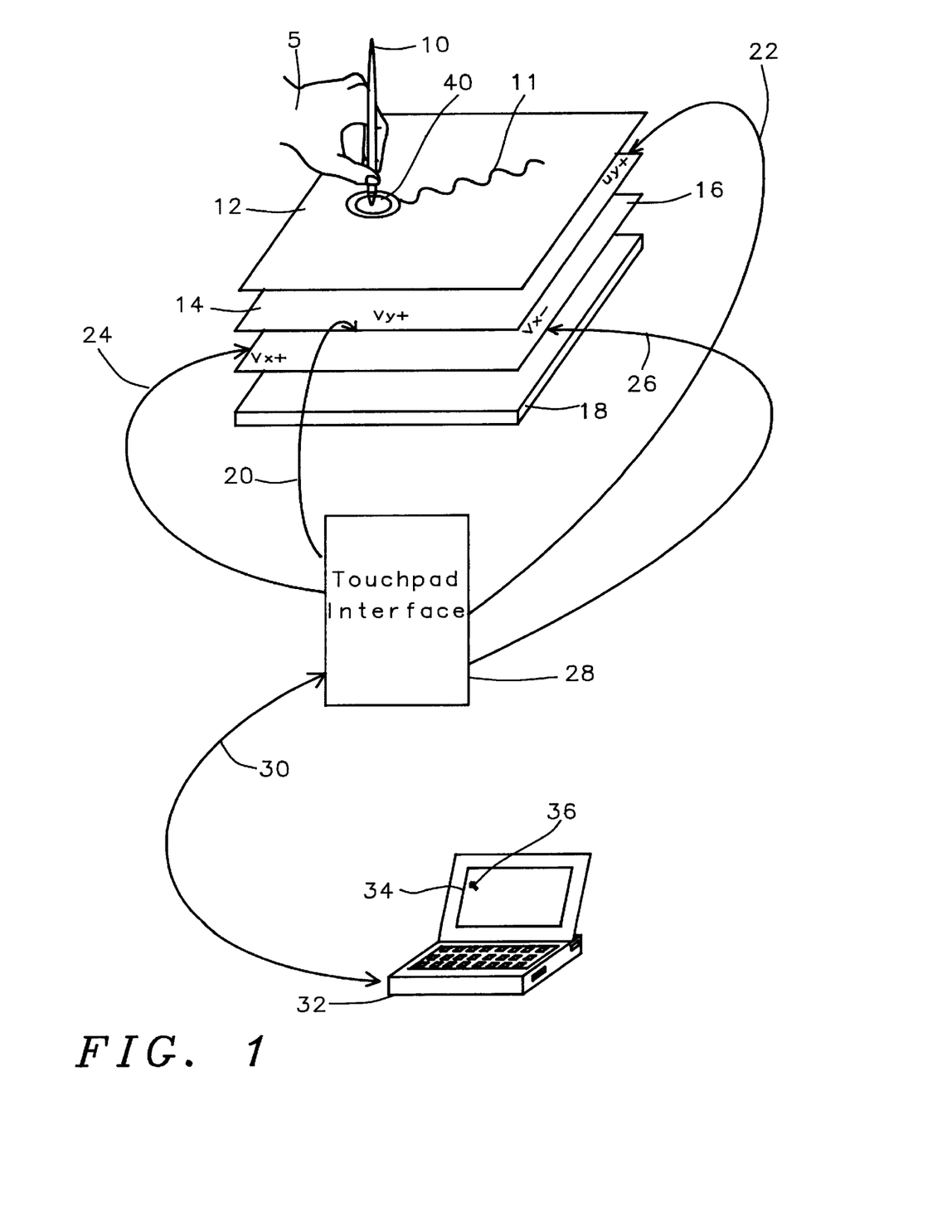
FIG. 1 is an illustration of a resistive film touchpad digitizer as a computer input device.

Referring to FIG. 1, the surface 12 of the touchpad becomes a "writing surface" for capturing the position of an pointed object 10 such as a finger, pen or stylus upon the touchpad. The touchpad signals are analog signals that will be captured by a touchpad interface circuit 28 and translated to digital codes that will be transferred to a computer system 32 on an interface 30. The interface 30 may be an industry standard serial interface, an industry standard parallel interface, or a custom interface requiring special adapter circuitry within the computer system 32 to accept the digital codes from the touchpad interface 28.

An example of a resistive touchpad is shown in FIG. 1. The resistive touchpad is made up of multiple layers of resistive films and protective layers. The protective hard coating 12 is the surface onto which the pointed object 10 is pressed upon during the writing and drawing. A first layer of resistive film 14 is attached to the protective hard coating 12 on the surface opposite the writing surface. This first layer of resistive film forms the Y-plane of the touchpad. Attached to the surface of the Y-plane resistive film 14 opposite the surface attached to the hard protective coating 12 is a second resistive film 16. This second resistive film 16 forms the X-plane of the touchpad. Finally attached to the side of the X-plane resistive film 16 is a supporting back layer 18. This back layer provides protection and mechanical support for the for the X-plane and Y-plane resistive films 14 and 16.

Figure 2:
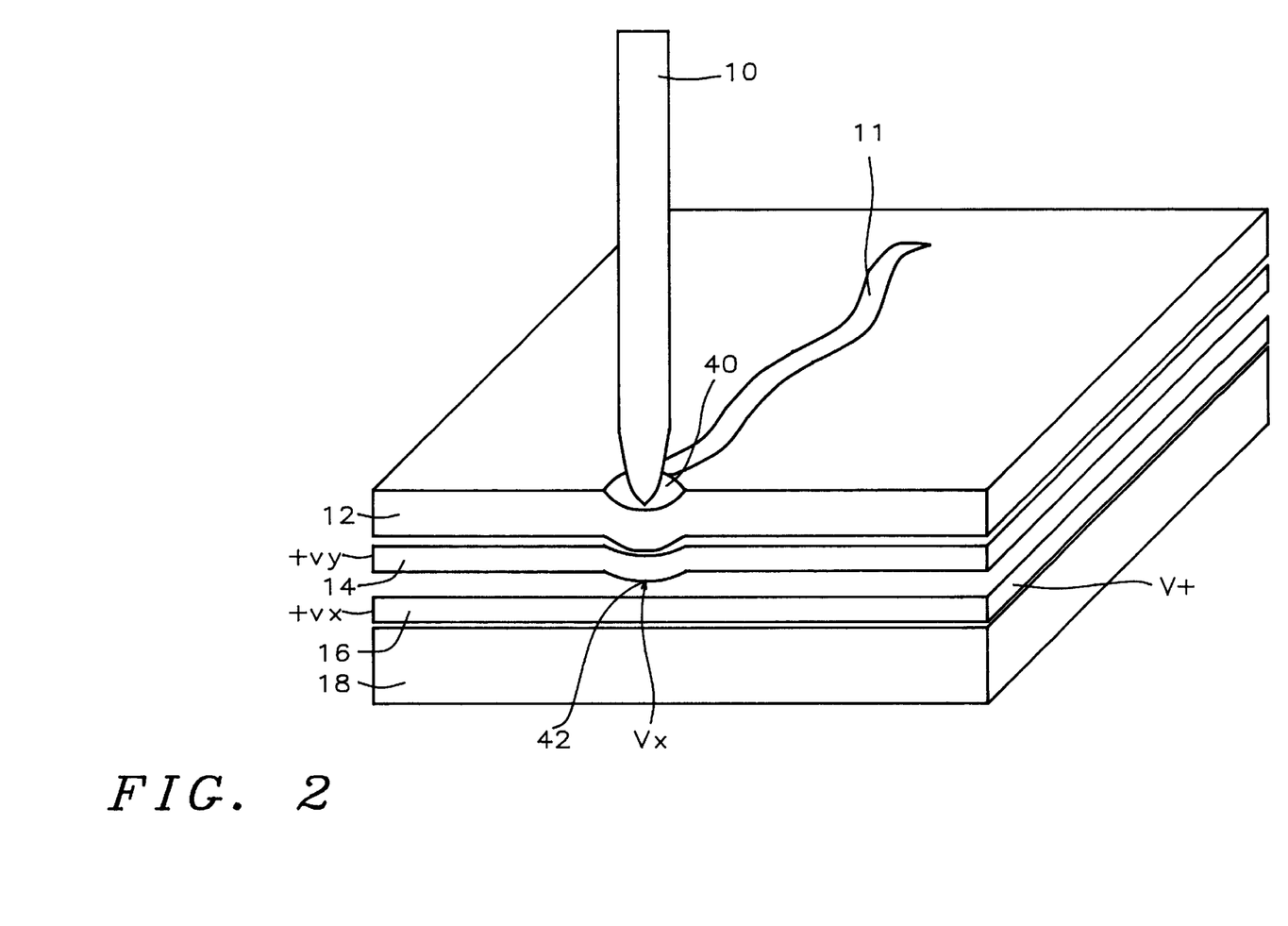
FIG. 2 is a diagram of a resistive film touchpad showing a the location of a pointed object such as a pen or stylus upon the touchpad.

The touchpad interface 28 is connected through the touchpad interface lines 20, 22, 24, and 26. Each line will provide a stimulus such as a current or voltage to the periphery of the X-plane resistive film 16 and the Y-plane resistive film 14. As shown in FIG. 2, as the pointed object 10 is pressed 40 on the touchpad surface 12, the Y-plane resistive film 12 will deform and touch the X-plane resistive film 14. The X-plane resistive film can not deform because it is supported by the supporting back layer 18. This causes the Y-plane resistive film 14 and the X-plane resistive film 16 to come into contact with each other. This will cause a response in the form a change in voltage or current depending upon whether the stimulus from the touchpad interface 28 of FIG. 1 is a constant voltage or a constant current. If the stimulus from the touchpad interface 28 of FIG. 1 is a constant voltage the currents through the touchpad interface lines 20, 22, 24, and 26 will be modified according the position of the pointed object 10 on the touchpad surface 12. However, if the stimulus from the touchpad interface 28 of FIG. 1 is a constant current the voltages between the touchpad interface lines 20, 22, 24, and 26 will be modified according to the position of the pointed object 10 on the touchpad surface 12.

Referring back to FIG. 1, the touchpad interface 28 will have a set of analog to digital converters that will sense the change in the analog responses from the touchpad interface lines 20, 22, 24, and 26 and convert them to digital codes indicating the absolute position of the pointed object 10 upon the touchpad surface 12. The digital codes may be transmitted directly to the computer system across the interface 30 and translated to absolute coordinates within the computer system or the touchpad interface 28 may determine the absolute coordinates and transmit them directly to the computer system 32. For the computer system 32 to use the absolute coordinates generated by the touchpad interface 28 to control the movement of the cursor 36 upon the display screen 34, these absolute coordinates must be modified to codes that define the relative motion of the cursor 36. The relative motion will be the speed and direction of the cursor 36 as it is moved across the display screen 34. The modification from absolute coordinates to relative motion information must be done within an internal mouse emulation program resident within the computer system 32.

As the pointed object 10 is placed upon the touchpad surface 12 and is moved in the path 11, the hand 5 will cause the motion of the path 11 to vary as a result of vibration or rocking of the hand 5 or the hand 5 will vary in pressure causing the center location 40 of the indentation shown in FIG. 2 to vary. This will cause unwanted changes in the digital codes being sent to the computer system 32. Additionally, the hand 5 will have electrical noise that will be coupled to the analog signals on the touchpad interface lines 20, 22, 24, and 26.

If there is dirt or moisture on the surface 12 of the touchpad, the analog signals will be corrupted causing unwanted variations in the digital codes being transferred to the computer system 32. Other noise that may effect the analog signals on the touchpad interface lines 20, 22, 24, and 26 may be internal to the computer system 32 such as from the computer system clocking subsystem, drivers on the nearby integrated circuit chips that will control the display 34, and other electromagnetic noise present within the computer system 32.

The unwanted variations in the digital codes may cause unwanted results such as the cursor 36 moving erratically across the display screen 34 or strokes or sweeps of that use the absolute locations of the pointed object 10 upon the touchpad surface 12 will become misinterpreted causing errors in handwriting recognition or graphics programs.

U.S. Pat. No. 5,327,161 (Logan, et al.) describes a method to emulate mouse input devices using a program resident within a computer system. A touchpad input device has a controller that generates a digital code that contains the absolute position of a pen or finger on the mouse pad. This requires a special interface that is unique to the touchpad circuitry. Additionally, this patent describes a method for the continuation of cursor movement when a pointed object is touching the touchpad and has been moved on the touchpad to a special border area. The pointed object must be stopped within the border for the continuous motion to be engaged. The direction of the scrolling may be made as a modification of the original direction and velocity of the pen prior to the transiting and stopping within the border area of the touchpad. This modification will be made as a change in the velocity of the movement of the cursor along an axis parallel to the edge of the touchpad adjacent to the border area where the pointed object is resting.

U.S. Pat. No. 5,376,946 (Mikan) describes a circuit using an EPROM to convert signals from a touch screen adhered to a computer display screen to digital codes of the industry standard computer input mouse protocols.

U.S. Pat. No. 5,543,590 (Gillespie, et al.) describes a capacitive sensor system that can detect the location of a finger or stylus on a sensor matrix. The location is determined and translated as electrical signals for use in other circuitry such as a computer system to control a cursor upon a display screen.

U.S. Pat. No. 5,543,591 (Gillespie, et al.) discloses methods for recognizing tapping, pushing, hopping and zigzagging gestures upon a conductive sensor pad that can be interpreted into cursor control motions such as clicking, double clicking, and click and drag use with computer mouse devices. Further this patent also describes the use of a running average for X and Y position data.

U.S. Pat. No. 5,488,204 (Mead) shows a proximity sensor system that has a capacitive touchpad. The capacitance of the touchpad changes with the proximity of an object to the touchpad. As the capacitance changes a voltage changes which is converted to electrical signals representing the X and Y coordinates of the object on the touchpad. A conductive paint brush stylus is used to produce paint-like strokes on a display screen associated with the touchpad. The system also incorporates features that allow the stylus to emulate the actions of a computer mouse including an "edge motion" where a cursor can be moved over long distances without rowing or stroking the stylus.

U.S. Pat. No. 5,287,119 (Drumm) describes a computer input device using orientation sensors. Orientation sensors are mounted on the head of an operator. The movement of the head of the operator will cause a cursor on a computer display screen to move. Part of the algorithm for the control of the data from the sensors involves averaging of a present value of orientation with a previous value of orientation before transmission of the orientation data to the computer system.

U.S. Pat. No. 4,193,118 (Nash et al) describes a circuit to extract a low frequency signal component from a composite signal composed of a high frequency signal and a low frequency signal. An analog-to-digital converter will convert the composite signal to a digital output signal. A storage register carries a running average of the composite that represents the low frequency component of the composite signal.

SUMMARY OF THE INVENTION

An object of this invention is to provide a touchpad digitizing device to convert electrical responses to the movements of a pointed object such as a pen, stylus, or finger upon a writing surface to digital codes that indicate the location and the pressure being applied by the pointed object to the writing surface. Another object of this invention is to detect the presence of the pointed object upon the writing surface and to provide a signal indicating such presence. Furthermore, another object of this invention is the translation of the digital codes indicating the location of the pointed object upon the touch pad to a set of digital codes acceptable by a computer system.

A primary object of this invention is to reduce variation in the digital codes indicating location of the pointed object due to vibration and movement of the pointed object in the human hand and electrical noise from components of the computer system.

To accomplish these and other objects, a touchpad digitizing computer input device has a touchpad digitizer that has a hard covering surface, a touch input transducer to convert the presence to electrical responses proportional to a distance of the pointed object from peripheral sides of the surface and proportional to the force of the pointed object upon the hard covering surface. A touchpad driver circuit is connected to the touchpad digitizer to provide an electrical stimulus to the touch input transducer.

The touchpad digitizing computer input devices has a multiplexed analog-to-digital converter to accept a plurality of analog signals including the electrical responses, and convert the plurality of analog signals to a plurality of digital codes that include a set of location digital codes representing the location of the pointed object upon the surface.

A pen detect circuit receives the electrical responses to create a pen detect signal when the pointed object has been placed upon the touchpad digitizer. An absolute coordinate calculator accepts and converts the location digital codes that represent the location of the pointed object on the touchpad digitizer relative to the periphery of the touchpad digitizer.

The pen detect signal and the absolute location digital codes are received by an absolute coordinate filtering circuit. The absolute coordinate filtering circuit will remove changes in the absolute location digital codes that result from random and vibratory motion of the pointed object upon the touchpad digitizer and from electrical noise from the computer system. The absolute coordinate filtering circuit will perform either a thresholding filtering process or a infinite impulse filtering process upon the absolute location digital codes when the pen detect signal indicates the pointed object is in contact with the surface of the touchpad digitizer. The absolute coordinate filtering circuit will create filtered absolute location digital codes.

The filtered absolute location digital codes are transferred to an absolute coordinate converter that converts the filtered absolute location digital codes to protocols acceptable by the computer system.

A touchpad computer interface accepts the pen detect signal and the protocols from the absolute coordinate code converter and conditions these signals for transfer to the computer system.

DETAILED DESCRIPTION OF THE INVENTION

Figure 3A:
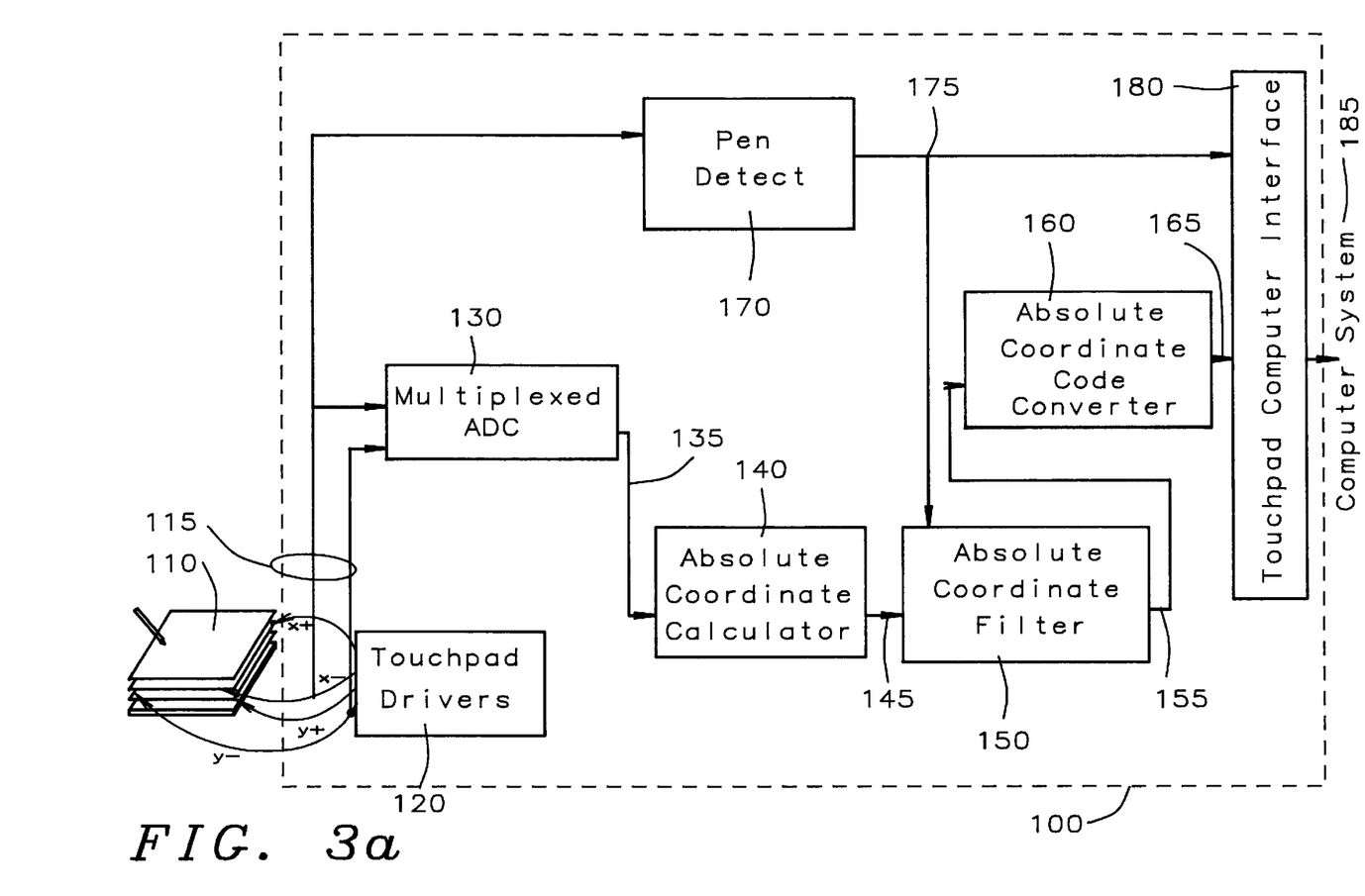
FIG. 3a is a schematic block diagram of the touchpad selectable pen-input/control system of this invention.

Referring to FIG. 3a, an embodiment of a touchpad pen-input control system 100 has a touchpad driver 120 which will provide a constant current as a stimulus to the touchpad 110. The touchpad driver 120 will provide a constant current source connected to the X+ line that is connected to the X-plane of the touchpad 110 and a constant current sink is connected to the X− line that is connected to the opposite side of the X-plane of the touchpad 110. The touchpad driver 120 will provide a second constant current source connected to the Y+ line that is connected to the Y-plane of the touchpad 110 and a second current sink that is connected to the Y− line that is connected to the Y-plane on the side opposite the connection of the Y+ line. As a pointed object such as a finger, stylus, or pen is moved across the touchpad, the resistance of the resistive film as described in FIG. 1 changes causing the voltage at the current sources connected to the X+ line and Y+ line and at the current sinks connected to the X− line and Y− line to vary. The voltage variation will be proportional to the distance that the contact is from the peripheral edges of the touchpad where the X+ and Y+ lines and the X− and Y− lines are attached.

The voltages present at the connections of the current sources connected X+ and Y+ lines and the current sinks connected to the X− and Y− lines are coupled 115 to a multiplexing analog-to-digital converter 130. These voltages are converted at regular timing intervals to a set of location digital codes 135 representing the amplitude of the voltages present at the connections of the current sources and current sinks connected to the X+, Y+, X− and Y− lines that indicate the location of the pointed object pressed on the touchpad 110 surface.

The voltages 115 present at the connections of the current sources connected to the X+ and Y+ lines and the current sinks connected to the X− and the Y− lines are also coupled to the pen detect 170. The pen detect circuit 170 will set the pen detect signal 175 to a first logic state when a change in the voltage at the current sink X− indicates that there has been a pointed object pressed on the touchpad 110 surface. The pen detect signal 175 will assume a second state when a change in the voltage at the current sink X− indicates that there is no object pressed on the touchpad 110 surface.

The location digital codes 135 are transferred to the absolute coordinate calculator 140. The location digital codes 135 are translated to absolute digital codes 145 that indicate the absolute location of the pointed object upon the touchpad 110 surface relative to the periphery of the touchpad 110. The absolute location digital codes 145 will contain the distances of the pointed object from the peripheral sides as Cartesian coordinates containing an X and a Y value.

The absolute location digital codes 145 and the pen detect signal 175 are transferred to the absolute coordinate filter circuit 150. An algorithmic control diagram for the absolute coordinate filter circuit 150 is shown in FIGS. 3b, 3c, 3d and 3e. The pen detect signal 175 is examined 245 for the presence of the pointed object upon the surface of the touchpad. If the pointed object is not present on the surface of the touchpad the absolute coordinate filter circuit 150 returns for the next sample 270. The pen detect signal 175 is examined 245 until the pointed object is in contact with the surface of the touchpad. When the pen detect signal 175 indicates the pointed object is in contact with the surface of the touchpad, the pen down register 242 is queried 247 to indicate whether the pointed object has been in contact with the touchpad at the previous sample. If the contents of the pen down register 242 indicates that the pointed object was in contact with the touchpad at the previous sample, a current sample of the absolute location digital codes 145 is placed 255 in the input register 205.

If the contents of the pen down register 242 indicates that the pointed object was not in contact with the touchpad at the previous sample, The pen down register is assigned 249 a true (1) value. The previous input register 230 is is assigned 250 the absolute location digital codes 145. The average register 230, that contains a running average of all previous absolute location digital codes 145, is assigned 252 the absolute location digital codes 145.

The filter select register 202 contains a control code that determines the type of filtering the absolute coordinate filter circuit 150 is to perform. The absolute coordinate filter 150 will perform an infinite impulse response filtering and/or a threshold filtering or no filtering. The infinite impulse response filtering will add the present sample of the absolute location digital codes 145 to a running average of all previous absolute location digital codes and divide the sum by two to create a new running average of all absolute location digital codes.

The threshold filtering will not accept the present sample of the absolute location digital codes 145, if the difference of the present sample of the absolute location digital codes 145 and a previous sample of the absolute digital codes 145 are either too small or too large or if they are of sufficient magnitude but not in the same direction. If the present sample of the absolute location digital codes 145 is rejected, the current sample of the absolute location digital codes 145 will be discarded and the previous sample of the absolute location digital codes 145 will be retained.

If the filter select register indicates there is to be no filtering 330 and 335, the previous input register 230 is assigned 340 the contents of the input register 205 and the output register 240 is assigned 342 the contents of the input register 205. The output register 240 is then transferred as the filtered absolute location digital codes 155 to the absolute coordinate code converter 160 and the process returns to the next sample NS 270.

If the filter select register 202 is examined 330 and the infinite impulse response filtering is desired, the average register 235 is assigned 300 the current running average of the absolute location digital codes 145. The current running average of the absolute location digital codes is calculated by summing the contents of the input register 205 (the current sample of the absolute location digital codes 145) with the contents of the average register 235 and dividing this sum by a factor of two. To avoid additional circuitry, those schooled in the art will recognize that the dividing operation can be accomplished by shifting the results of the summing operation by one binary digit toward the least significant digit. The contents of the average register 235 are then assigned 310 to the input register 205.

If the filter select register 202 indicates 335 that the threshold filtering is to be performed, the difference movement register 210 will receive 260 the results of the subtraction of the previous input register 230 which contains the previous sample of the absolute location digital codes and the input register 205. The absolute value of the difference movement register 210 is compared 265 to the excess difference threshold register 225. The excess difference threshold is shown in FIG. 4. The excess difference threshold 540 is the amount of movement 570 the pointed object 510 can move on the touchpad surface 500, and if exceeded will be considered to be unwanted movement or vibration or electrical noise as described above.

Returning now to FIGS. 3b, 3c, 3d, 3e, if the absolute value of the difference movement 210 is greater than the excess difference threshold register 225, the difference movement register 210 is assigned 285 an initial value (0) and the input register 205 is assigned 287 the contents of the previous input register 230. The output register 240 is then transferred as the filtered absolute location digital codes 155 to the absolute coordinate code converter 160 and the process returns to the next sample NS 270. If however, the absolute value of the difference register 210 is less than the excess difference threshold register 225, the signed magnitude value of the difference movement register 210 is now compared 275 to the initial movement threshold register 215. The initial movement threshold register 215 contains the value of the initial movement threshold. The initial movement threshold is shown in FIG. 4 and is defined as the amount of movement 550 that is necessary for the pointed object 510 to have traversed on the surface 500 of the touchpad digitizer. Any detected movement that is less than the initial movement threshold 520 is considered to be unwanted vibration or movement of the pointed object 510 or electrical noise from circuits or subsystems of the computer system in close proximity to the touchpad 500.

Referring again to FIGS. 3b, 3c, 3d, 3e, if the signed magnitude value of the difference movement register 210 is less than the initial movement threshold register 215, the previous input register 230 is assigned 340 the contents of the input register 205 and the output register 240 is assigned 342 the contents of the input register 205. The output register 240 is then transferred as the filtered is absolute location digital codes 155 to the absolute coordinate code converter 160 and the process returns to the next sample NS 270. If, however, the signed magnitude value of the difference register 210 is greater than the initial movement threshold register 215, the difference movement register 210 is compared 280 to the intentional movement threshold register 220.

The intentional movement threshold register 220 contains the value of the intentional movement threshold. Referring again to FIG. 4, the intentional movement threshold 530 is the amount of movement in the same direction of the pointed object 510 must be moving 560 to be considered intentional movement of the pointed object 510 upon the touchpad surface 500. If the movement is not in the same direction as the direction of movement of the previous movement, the reading is considered to be unwanted movement or vibration or electrical noise as described above.

Returning again to FIGS. 3b, 3c, 3d, 3e, if the absolute magnitude of difference movement register 210 is less than the intentional movement threshold register 220, the previous input register 230 is assigned 340 the contents of the input register 205 and the output register 240 is assigned 342 the contents of the input register 205. The output register 240 is then transferred as the filtered absolute location digital codes 155 to the absolute coordinate code converter 160 and the process returns to the next sample NS 270.

However, if the absolute magnitude of the difference movement register 210 is greater than the intentional movement register 220, the direction component of the difference movement register is compared 282 to the direction component of the intentional movement threshold register 220. If the direction component of the difference movement register 210 is not equal to the direction component of the intentional movement threshold register 220, the difference movement register 210 is assigned 285 an initial value (0) and the input register 205 is assigned 287 the contents of the previous input register 230. The output register 240 is then transferred as the filtered absolute location digital codes 155 to the absolute coordinate code converter 160 and the process returns to the next sample NS 270.

However if the direction component of the difference movement register 210 is equal to the direction component of the intentional movement threshold register 220, the previous input register 230 is assigned 340 the contents of the input register 205 and the output register 240 is assigned 342 the contents of the input register 205. The output register 240, which contains the filtered absolute location digital codes 155, transfers the filtered absolute location digital codes 155 to the absolute coordinate code converter 160 and the absolute coordinate filter 150 returns for the next sample NS 270.

Returning to FIG. 3a, the absolute coordinate code converter will translate the filtered absolute location digital codes 155 to a touchpad/computer interface protocol 165 that is acceptable by the computer system 185. The touchpad computer interface protocol 165 and the pen detect signal 175 are be transferred to the touchpad computer interface 180. The touchpad computer interface protocol 165 and the pen detect signal 175 will be buffered and converted to electrical signal levels that conform to the electrical specifications required of the interface between the touchpad-computer interface 180 and the computer system 185. The touchpad computer interface protocol 165 and the pen detect signal 175 are transferred to the computer system for further processing.

Figure 3B:
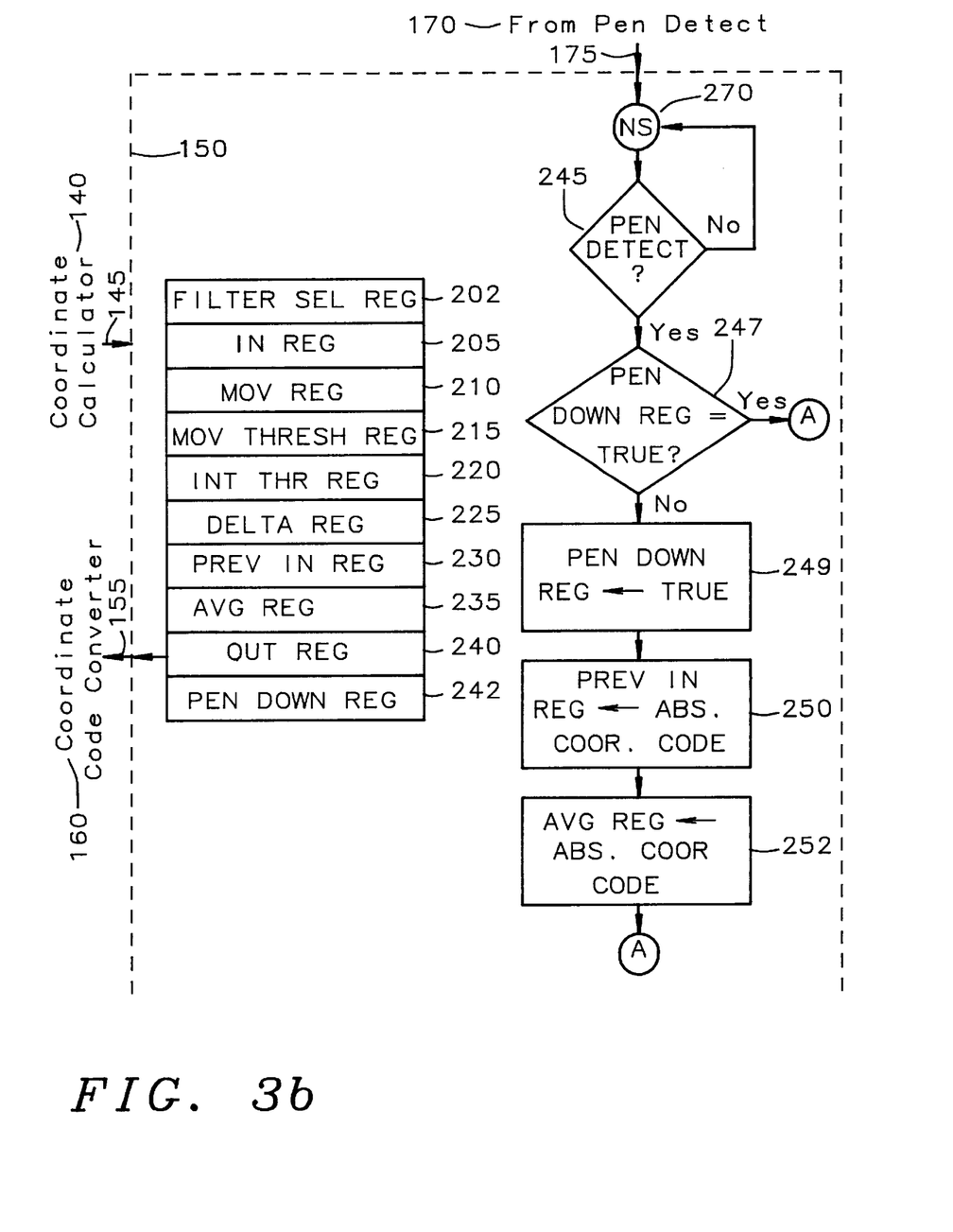
FIGS. 3b, 3c, 3d and 3e are algorithmic control diagrams of an absolute coordinate filter circuit of this invention.
Figure 3C:
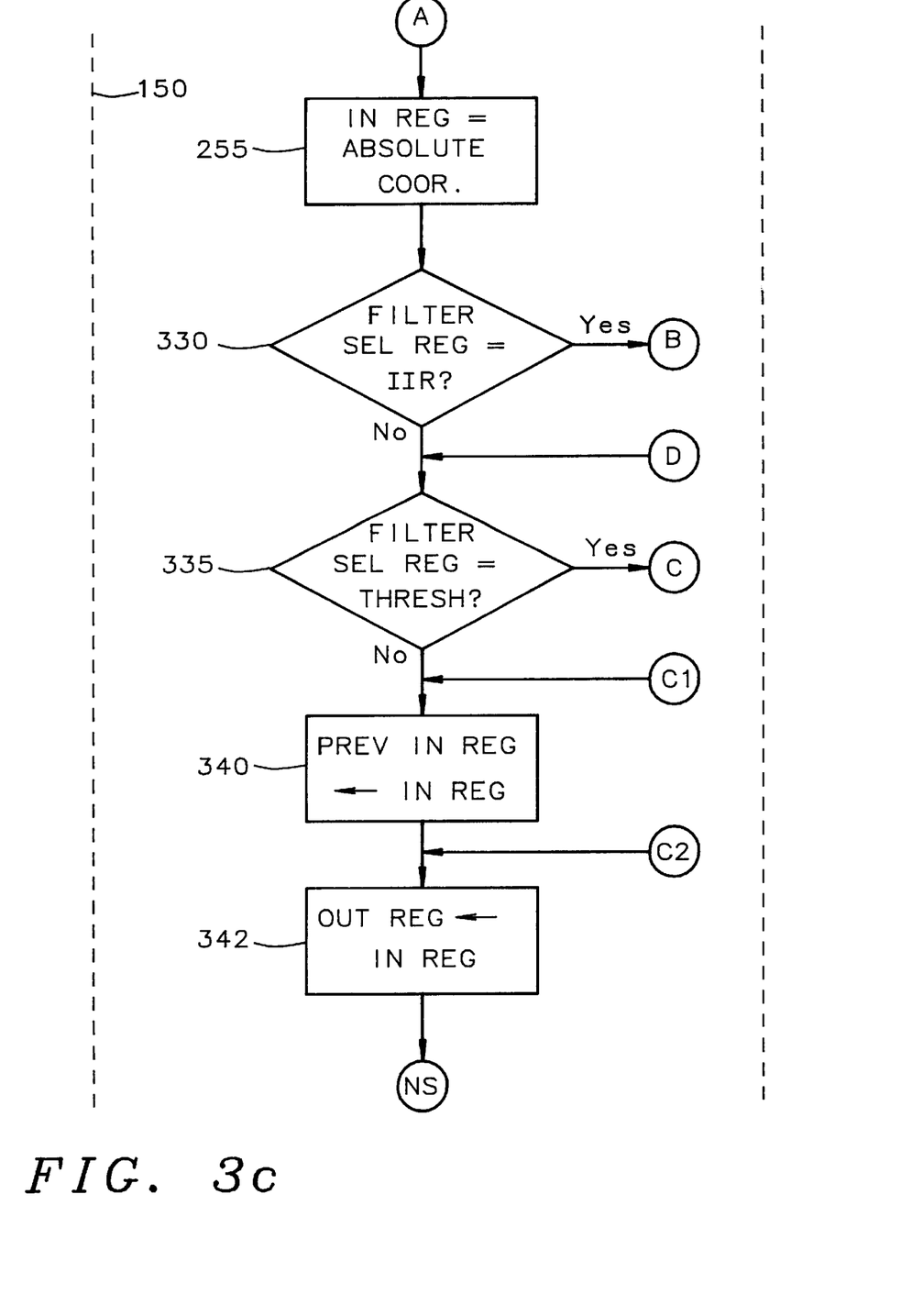
Figure 3D:
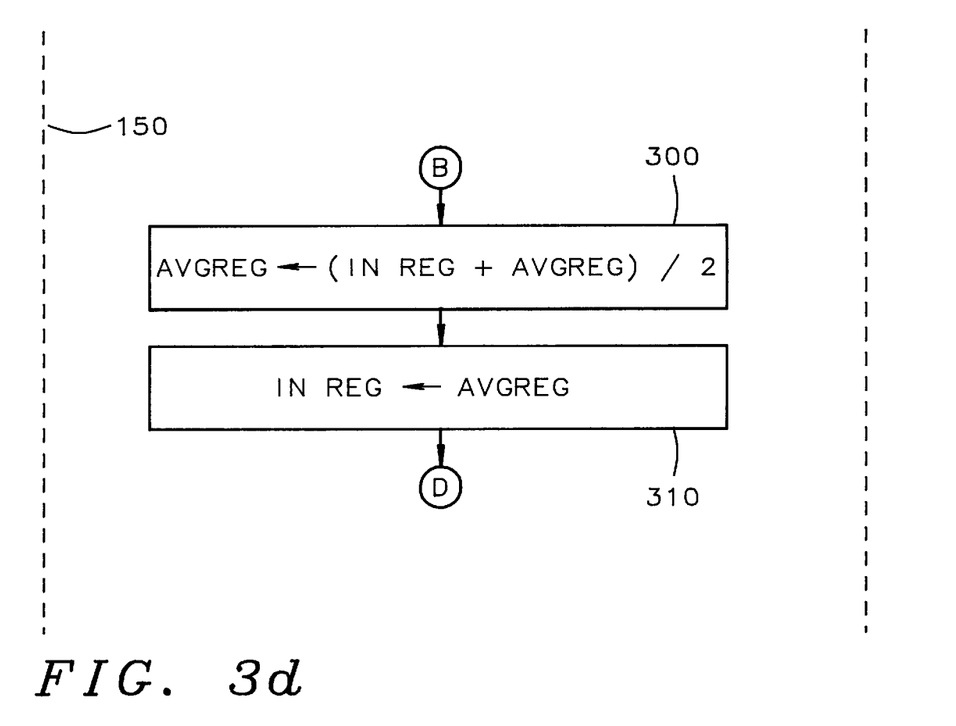
Figure 3E:
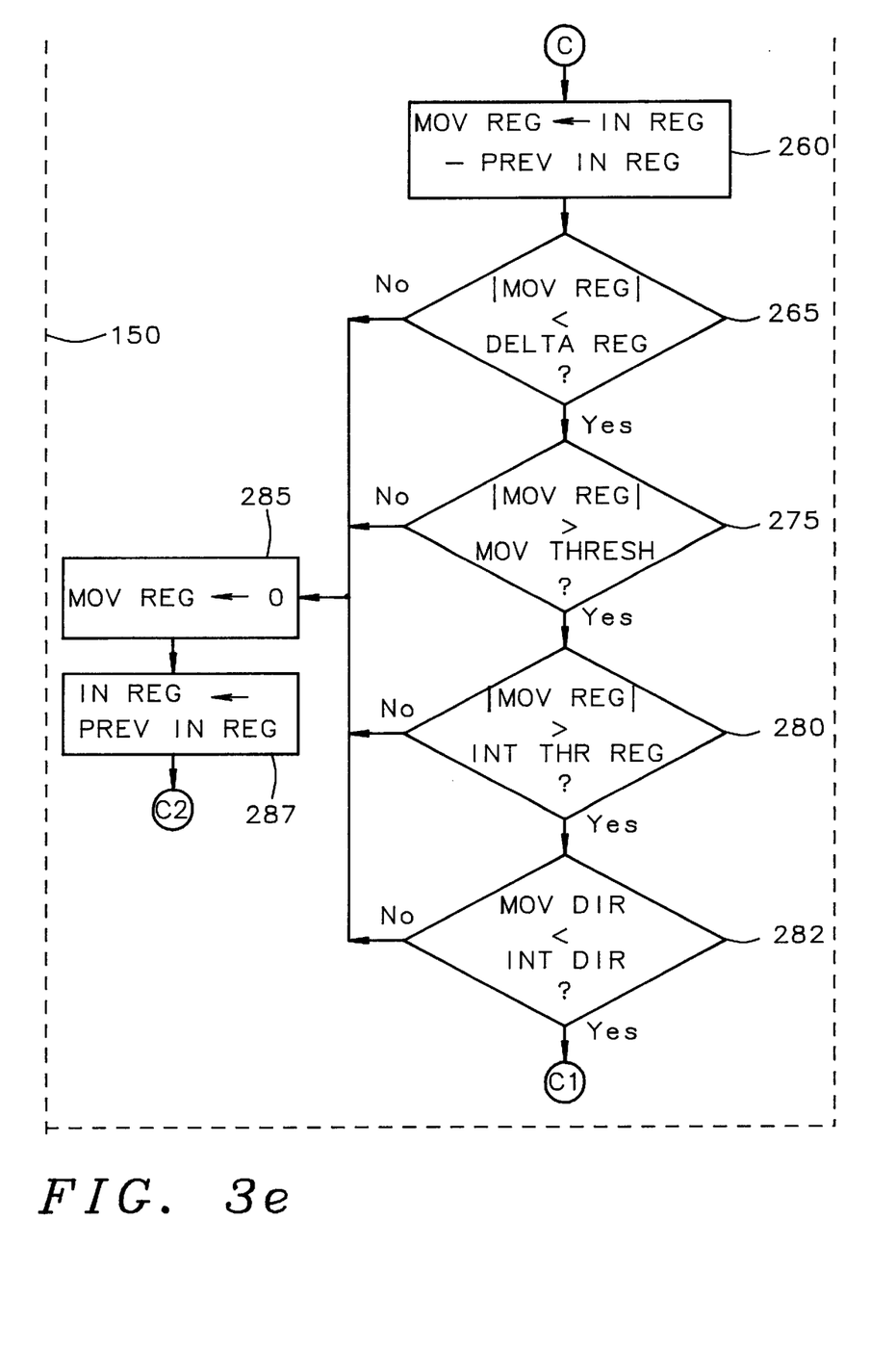
Figure 4:
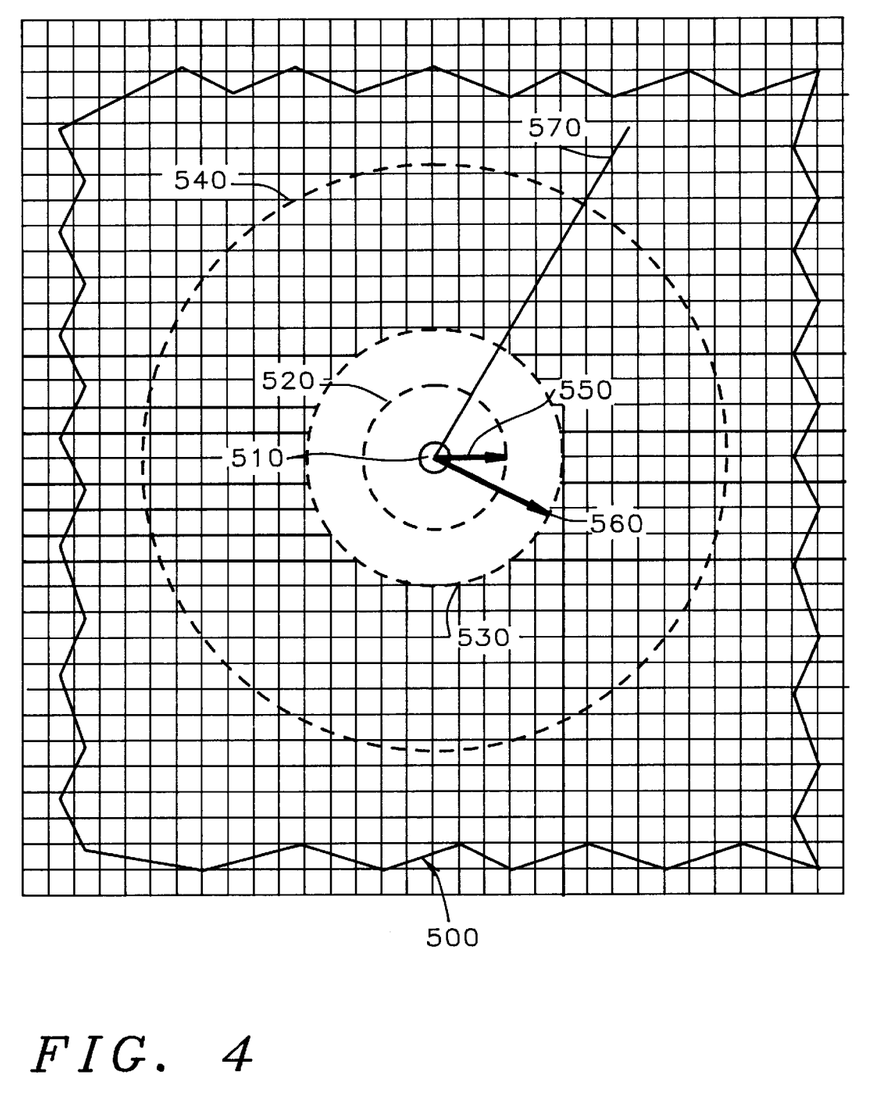
FIG. 4 is an illustration of the top surface of a touchpad showing the initial movement threshold, the intentional movement threshold, and the excess movement threshold of this invention.

While the embodiment of FIGS. 3b, 3c, and 3d describes an absolute coordinate filter capable of selectively performing either threshold filtering or infinite impulse response filtering or both threshold filtering and infinite impulse response filtering, it will be obvious to those schooled in the art that an absolute coordinate filter could be fabricated using only a threshold filtering or only an infinite impulse response filtering.

It should be noted that an advantage of the infinite impulse response filter is in its simplicity and economy of circuits when compared to other filtering techniques such as threshold filtering and "N" sample average filtering. The threshold filtering is as described above. While the "N" sample average filtering requires storing the "N" samples (i.e. if N=4, four storage locations are required, summing the samples and dividing the sum by the factor of "N". Each sample will require summing of N−1 previous samples with the current sample and dividing this result by the factor of N. If the factor of "N" is not a binary number then a complicated divider circuit will be required.

While this invention has been particularly shown and described with reference to the preferred embodiments thereof, it will be understood by those skilled in the art that various changes in form and details may be made without departing from the spirit and scope of the invention.

What is claimed is:

1. A touchpad digitizing computer input device to detect a presence of a pointed object upon a surface of said touchpad computer input device and converting said presence to a set of digital codes that indicate absolute location of said pointed object upon said surface, comprising:
   a) a touchpad digitizer having a hard covering surface and a touch input transducer to convert said presence to electrical responses proportional to a distance of said pointed object from peripheral sides of said hard covering surface;
   b) a touchpad driver circuit connected to said touchpad digitizer to provide an electrical stimulus to said touch input transducer;
   c) an analog-to-digital converter to accept a plurality of analog signals including the electrical responses and the pressure analog signal, and convert at regular periodic intervals of time said plurality of analog signals to a plurality of digital codes that include a set of location digital codes representing the location of the pointed object upon the surface;
   d) a pen detect circuit that receives said electrical responses to create a pen detect signal when said pointed object has been placed upon said touchpad digitizer;
   e) an absolute coordinate calculator to convert the location digital codes to the absolute location digital codes that represent the location of the pointed object upon the touchpad digitizer;
   f) an absolute coordinate filter means to filter the absolute location digital codes to create filtered absolute location digital codes that remove random and vibratory motions of the pointed object upon the touchpad digitizer and electrical noise induced to said touchpad digitizing computer input device from external sources, to create a smooth change of position indication of said absolute location digital codes;
   g) an absolute coordinate code converter connected to the absolute coordinate filter means to convert the filtered absolute location digital codes to a touchpad computer interface protocol that is acceptable by the computer system; and
   h) a touchpad computer interface to receive and convert the touchpad computer interface protocol and the pen detect signal, to buffer said touchpad computer interface protocol and said pen detect signal, and to convert said touchpad computer interface protocol and said pen detect signal to electrical signal levels that conform to the electrical specifications required of a interface between the touchpad-computer interface and the computer system to the computer system for further processing.

2. The input device of claim 1 wherein the electrical responses varies in magnitude according to the location of said pointed object upon said touchpad.

3. The input device of claim 1 wherein the pointed object is selected from the set of pointed objects including a human finger, a stylus, and a pen.

4. The input device of claim 1 wherein the electrical response selected from the set of electrical responses that include a change in voltage, a change in current, and a change in frequency of an oscillating signal.

5. The input device of claim 1 wherein filtering the absolute location digital codes is accomplished by a filtering process selected from the set of filtering processes comprising a thresholding process and an infinite impulse response filtering process, wherein:
   a) the infinite impulse response filtering process comprises the steps of:
      if there are no previous running average absolute location digital codes, the present absolute location digital codes are assigned to previous running average absolute location digital codes,
      calculating a running average absolute location digital codes by adding the previous running average absolute location digital codes to the present absolute location digital codes and dividing a resulting sum by two to create current running average absolute location digital codes, and
      placing the current running average absolute location digital codes in the filtered absolute location digital codes and the previous running average absolute location digital codes; and
   b) the thresholding process comprises the steps of:
      accepting for processing present absolute location digital codes, if the present absolute location digital codes have changed from previous absolute location digital codes by a magnitude greater than an initial movement threshold to indicate that the pointed object is intended to move,
      accepting for processing the present absolute location digital codes if present absolute location digital codes have changed from previous absolute location digital codes by a magnitude greater than an intentional movement threshold if the pointed object is moving in a direction that is identical to that when said pointed object traversed the initial movement threshold,
      accepting for processing the present absolute location digital codes if present absolute location digital codes have changed from previous absolute location digital codes by a magnitude less than an excess difference threshold that indicates the absolute location digital codes is to large and not a valid absolute location digital codes,
      if the present absolute location digital codes are not accepted for processing, placing the previous absolute location digital codes in the filtered absolute location digital codes, and
      if the present absolute location digital codes are not accepted for processing, placing said present absolute location digital codes in the filtered absolute location digital codes.

6. The input device of claim 1 wherein the absolute coordinate filter means comprises:
   a) a current input register to receive at the regular periodic intervals of time the absolute location digital codes and to retain said absolute location digital codes;
   b) a previous input register to retain a previous absolute location digital codes;
   c) a subtractor circuit to subtract current input register from the previous input register to form a difference movement digital code;
   d) a difference movement register connected to the subtractor to receive the difference movement digital code;
   e) an initial movement comparator to compare the difference movement register to the initial movement threshold;

f) an intentional movement comparator to compare the difference movement register to the intentional movement threshold;

g) an excess difference comparator to compare the difference movement register to the excess difference threshold;

h) an output register to retain the filtered absolute location digital codes for transfer to the absolute location code converter;

i) a pen down indicator means to retain an indication that a current sampling of said absolute location digital codes are a first sampling of the absolute location digital codes;

j) a filter control means that:
  will set the previous input register to an initial value if the pen detect signal indicates the pointed object is not in contact with the touchpad digitizer,
  will set said pen down indicator means to a true value if said current sampling of said absolute location digital codes are said first sampling and will place said absolute location digital codes in the previous input register,
  will place the absolute location digital codes in the current input register, if the pen detect signal indicates the pointed object is in contact with the touchpad digitizer,
  will discard current absolute location digital codes from the input register and place the previous absolute location digital codes from the previous input register in the output register, if the initial movement comparator indicates the difference movement register is less than the initial movement threshold and said intentional movement threshold, and greater than said excess difference threshold,
  will place current absolute location digital codes from the input register in the output register if the initial movement comparator indicates the difference movement register is greater than the initial movement threshold and said intentional movement threshold, and less than said excess difference threshold, and
  will set the previous input register to an initial value if the pen detect signal indicates that the pointed object is not in contact with the touchpad digitizer.

7. The input device of claim 1 wherein the absolute coordinate filter means comprises:

a) a current input register to receive at the regular periodic intervals of time the absolute location digital codes and to retain said absolute location digital codes;

b) a previous input register to retain a previous absolute location digital codes;

c) a running average register to retain the running average absolute location digital codes for next average calculations;

d) an adder to sum the input register to the running average register;

e) a divider to divide the sum of the input register and the running average register by a factor of two to create a next running average absolute location digital codes;

f) an output register to retain and transfer the next running average absolute location digital codes as the filtered absolute location digital codes for transfer to the absolute coordinate code converter;

g) a pen down indicator means to retain an indication that a current sampling of said absolute location digital codes are a first sampling of the absolute location digital codes;

h) a filter control means that:
  will set the previous input register to an initial value if the pen detect signal indicates the pointed object is not in contact with the touchpad digitizer,
  will set said pen down indicator means to a true value if said current sampling of said absolute location digital codes are said first sampling and will place said absolute location digital codes in the previous input register and said running average register,
  will place the absolute location digital codes in the current input register, if the pen detect signal indicates the pointed object is in contact with the touchpad digitizer,
  will replace the running average absolute location digital codes in the running average register with the current absolute location digital codes from the input register the previous input register has been set to the initial digital code, and
  will copy the next running average absolute location digital codes to the running average register from the output register for a next processing of a next sample of the absolute location digital codes, when the adder has summed the contents of the input register and the running average register and results have been divided by two in the divider to for the next running average digital codes.

8. The input device of claim 5 wherein the absolute coordinate filter means comprises:

a) a current input register to receive at the regular periodic intervals of time the absolute location digital codes and to retain said absolute location digital codes;

b) a previous input register to retain a previous absolute location digital codes;

c) a mode select register to retain a mode select code wherein said mode select code comprises:
  a no filter code that commands said absolute coordinate filter means to perform no filtering and pass the current input register to the output register,
  a threshold filter code that will command said absolute coordinate filter means to perform the thresholding filter process,
  a infinite impulse response filter code that will command said absolute coordinate filter means to perform the infinite impulse response filter process, and
  a threshold filter/infinite impulse response code that will command said absolute coordinate filter means to perform both the thresholding filter process and the infinite impulse response filter process;

d) a subtractor circuit to subtract current input register from the previous input register to form a difference movement digital code;

e) a difference movement register connected to the subtractor to receive the difference movement digital code;

f) an initial movement comparator to compare the difference movement register to the initial movement threshold;

g) an intentional movement comparator to compare the difference movement register to the intentional movement threshold;

h) an excess difference comparator to compare the difference movement register to the excess difference threshold;

i) a running average register to retain the running average absolute location digital codes for next average calculations;

j) an adder to sum the input register to the running average register;

k) a divider to divide the sum of the input register and the running average register by a factor of two to create a next running average absolute location digital codes;

l) an output register to retain and transfer the next running average absolute location digital codes to the absolute coordinate code converter;

m) a pen down indicator means to retain an indication that a current sampling of said absolute location digital codes are a first sampling of the absolute location digital codes;

n) a filter control means that
will set the previous input register to an initial value if the pen detect signal indicates the pointed object is not in contact with the touchpad digitizer,
will set said pen down indicator means to a true value if said current sampling of said absolute location digital codes are said first sampling and will place said absolute location digital codes in the previous input register and said running average register,
will place the absolute location digital codes in the current input register, if the pen detect signal indicates the pointed object is in contact with the touchpad digitizer,
if the mode select register contains an thresholding filter
code, will discard current absolute location digital codes from the input register and place the previous absolute location digital codes from the previous input register in the output register, if the initial movement comparator indicates the difference movement register is less than the initial movement threshold and said intentional movement threshold, and greater than said excess difference threshold,
will place current absolute location digital codes from the input register in the output register if the initial movement comparator indicates the difference movement register is greater than the initial movement threshold and said intentional movement threshold, and less than said excess difference threshold,
if the mode select register contains a infinite impulse response filter code, will replace the running average absolute location digital codes in the running average register with the current absolute location digital codes from the input register the previous input register has been set to the initial digital code, and
will copy the next running average absolute location digital codes to the running average register from the output register for a next processing of a next sample of the absolute location digital codes, when the adder has summed the contents of the input register and the running average register and results have been divided by two in the divider to for the next running average digital codes.

9. A digitizer/computer input device control circuit to accept electrical response signals generated by a pointed object in contact with a digitizing surface such as touchpad digitizer, and to create a pen-input protocol if a pen-input mode is selected and to create a computer input mouse protocol having a running average absolute location digital codes that will minimize vibration and noise present in the electrical response signals for transmission to a computer system for further processing, comprising:

a) a digitizer driver circuit connected to said digitizing surface to provide an electrical stimulus to said digitizing surface;

b) an analog-to-digital converter to accept a plurality of analog signals including the electrical responses and the pressure analog signal, and convert at regular periodic intervals of time said plurality of analog signals to a plurality of digital codes that include a set of location digital codes representing the location of the pointed object upon the surface;

c) a pen detect circuit that receives said electrical responses to create a pen detect signal when said pointed object has been placed upon said digitizing surface;

d) an absolute coordinate calculator to convert the location digital codes to the absolute location digital codes that represent the location of the pointed object upon the digitizing surface;

e) an absolute coordinate filter means to filter the absolute location digital codes to create the running average absolute location digital codes that remove random and vibratory motions of the pointed object upon the touchpad digitizer and electrical noise induced to said touchpad digitizing computer input device from external sources, to create a smooth change of position indication of said absolute location digital codes;

f) an absolute coordinate code converter connected to the absolute coordinate filter means to convert the running average absolute location digital codes to a touchpad computer interface protocol that is acceptable by the computer system; and g) a touchpad computer interface to receive and convert the touchpad computer interface protocol and the pen detect signal to buffer said touchpad computer interface protocol and said pen detect signal and convert said touchpad computer interface protocol and said pen detect signal to electrical signal levels that conform to the electrical specifications required of a interface between the touchpad-computer interface and the computer system to the computer system for further processing.

10. The input device of claim 9 wherein filtering the absolute location digital codes is accomplished by a filtering process selected from the set of filtering processes comprising a thresholding process and an infinite impulse response filtering process, wherein:

a) the thresholding process comprises the steps of:
accepting for processing present absolute location digital codes, if the present absolute location digital codes have changed from previous absolute location digital codes by a magnitude greater than an initial movement threshold to indicate that the pointed object is intended to move,
accepting for processing the present absolute location digital codes if present absolute location digital codes have changed from previous absolute location digital codes by a magnitude greater than an intentional movement threshold if the pointed object is moving in a direction that is identical to that when said pointed object traversed the initial movement threshold,
accepting for processing the present absolute location digital codes if present absolute location digital codes have changed from previous absolute location digital codes by a magnitude less than an excess difference threshold that indicates the absolute location digital codes is to large and not a valid absolute location digital codes,
if the present absolute location digital codes are not accepted for processing, placing the previous absolute location digital codes in the filtered absolute location digital codes, and if the present absolute location digital codes are not accepted for processing, placing said present absolute location digital codes in the filtered absolute location digital codes; and b) the infinite impulse response filtering process comprises the steps of:

if there are no previous running average absolute location digital codes, the present absolute location digital codes are assigned to previous running average absolute location digital codes, calculating a running average absolute location digital codes by adding the previous running average absolute location digital codes to the present absolute location digital codes and dividing a resulting sum by two to create current running average absolute location digital codes, and placing the current running average absolute location digital codes in the filtered absolute location digital codes and the previous running average absolute location digital codes.

11. The input device of claim 9 wherein the absolute coordinate filter means comprises:

a) a current input register to receive at the regular periodic intervals of time the absolute location digital codes and to retain said absolute location digital codes;

b) a previous input register to retain a previous absolute location digital codes;

c) a subtractor circuit to subtract current input register from the previous input register to form a difference movement digital code;

d) a difference movement register connected to the subtractor to receive the difference movement digital code;

e) an initial movement comparator to compare the difference movement register to the initial movement threshold;

f) an intentional movement comparator to compare the difference movement register to the intentional movement threshold;

g) an excess difference comparator to compare the difference movement register to the excess difference threshold;

h) an output register to retain the filtered absolute location digital codes for transfer to the absolute location code converter;

i) a pen down indicator means to retain an indication that a current sampling of said absolute location digital codes are a first sampling of the absolute location digital codes;

j) a filter control means that:

will set the previous input register to an initial value if the pen detect signal indicates the pointed object is not in contact with the touchpad digitizer, will set said pen down indicator means to a true value if said current sampling of said absolute location digital codes are said first sampling and will place said absolute location digital codes in the previous input register, will place the absolute location digital codes in the current input register, if the pen detect signal indicates the pointed object is in contact with the touchpad digitizer, will discard current absolute location digital codes from the input register and place the previous absolute location digital codes from the previous input register in the output register, if the initial movement comparator indicates the difference movement register is less than the initial movement threshold and said intentional movement threshold, and greater than said excess difference threshold, will place current absolute location digital codes from the input register in the output register if the initial movement comparator indicates the difference movement register is greater than the initial movement threshold and said intentional movement threshold, and less than said excess difference threshold, and will set the previous input register to an initial value if the pen detect signal indicates that the pointed object is not in contact with the touchpad digitizer.

12. The input device of claim 9 wherein the absolute coordinate filter means comprises:

a) a current input register to receive at the regular periodic intervals of time the absolute location digital codes and to retain said absolute location digital codes;

b) a previous input register to retain a previous absolute location digital codes;

c) a running average register to retain the running average absolute location digital codes for next average calculations;

d) an adder to sum the input register to the running average register;

e) a divider to divide the sum of the input register and the running average register by a factor of two to create a next running average absolute location digital codes;

f) an output register to retain and transfer the next running average absolute location digital codes as the filtered absolute location digital codes for transfer to the absolute coordinate code converter;

g) a pen down indicator means to retain an indication that a current sampling of said absolute location digital codes are a first sampling of the absolute location digital codes;

h) a filter control means that:

will set the previous input register to an initial value if the pen detect signal indicates the pointed object is not in contact with the touchpad digitizer, will set said pen down indicator means to a true value if said current sampling of said absolute location digital codes are said first sampling and will place said absolute location digital codes in the previous input register and said running average register, will place the absolute location digital codes in the current input register, if the pen detect signal indicates the pointed object is in contact with the touchpad digitizer, will replace the running average absolute location digital codes in the running average register with the current absolute location digital codes from the input register the previous input register has been set to the initial digital code, will copy the next running average absolute location digital codes to the running average register from the output register for a next processing of a next sample of the absolute location digital codes, when the adder has summed the contents of the input register and the running average register and results have been divided by two in the divider to for the next running average digital codes.

13. The input device of claim 9 wherein the absolute coordinate filter means comprises:

a) a current input register to receive at the regular periodic intervals of time the absolute location digital codes and to retain said absolute location digital codes;

b) a previous input register to retain a previous absolute location digital codes;

c) a mode select register to retain a mode select code wherein said mode select code comprises:
   a no filter code that commands said absolute coordinate filter means to perform no filtering and pass the current input register to the output register,
   a threshold filter code that will command said absolute coordinate filter means to perform the thresholding filter process,
   a infinite impulse response filter code that will command said absolute coordinate filter means to perform the infinite impulse response filter process, and
   a threshold filter/ infinite impulse response code that will command said absolute coordinate filter means to perform both the thresholding filter process and the infinite impulse response filter process;

d) a subtractor circuit to subtract current input register from the previous input register to form a difference movement digital code;

e) a difference movement register connected to the subtractor to receive the difference movement digital code;

f) an initial movement comparator to compare the difference movement register to the initial movement threshold;

g) an intentional movement comparator to compare the difference movement register to the intentional movement threshold;

h) an excess difference comparator to compare the difference movement register to the excess difference threshold;

i) a running average register to retain the running average absolute location digital codes for next average calculations;

j) an adder to sum the input register to the running average register;

k) a divider to divide the sum of the input register and the running average register by a factor of two to create a next running average absolute location digital codes;

l) an output register to retain and transfer the next running average absolute location digital codes to the absolute coordinate code converter;

m) a pen down indicator means to retain an indication that a current sampling of said absolute location digital codes are a first sampling of the absolute location digital codes;

n) a filter control means that
   will set the previous input register to an initial value if the pen detect signal indicates the pointed object is not in contact with the touchpad digitizer,
   will set said pen down indicator means to a true value if said current sampling of said absolute location digital codes are said first sampling and will place said absolute location digital codes in the previous input register and said running average register,
   will place the absolute location digital codes in the current input register, if the pen detect signal indicates the pointed object is in contact with the touchpad digitizer,
   if the mode select register contains an thresholding filter
      code, will discard current absolute location digital codes from the input register and place the previous absolute location digital codes from the previous input register in the output register, if the initial movement comparator indicates the difference movement register is less than the initial movement threshold and said intentional movement threshold, and greater than said excess difference threshold,
      will place current absolute location digital codes from the input register in the output register if the initial movement comparator indicates the difference movement register is greater than the initial movement threshold and said intentional movement threshold, and less than said excess difference threshold,
   if the mode select register contains a infinite impulse response filter code, will replace the running average absolute location digital codes in the running average register with the current absolute location digital codes from the input register the previous input register has been set to the initial digital code, and
      will copy the next running average absolute location digital codes to the running average register from the output register for a next processing of a next sample of the absolute location digital codes, when the adder has summed the contents of the input register and the running average register and results have been divided by two in the divider to for the next running average digital codes.

14. The control circuit of claim 9 wherein the electrical responses varies in magnitude according to the location of said pointed object upon said touchpad.

15. The control circuit of claim 9 wherein the pointed object is selected from the set of pointed objects including a human finger, a stylus, and a pen.

16. The control circuit of claim 9 wherein the electrical response selected from the set of electrical responses that include a change in voltage, a change in current, and a change in frequency of an oscillating signal.

17. A method to detect the placement of a pointed object upon a digitizing surface, to filter random vibration and noise from said detected placement, and to create filtered instantaneous location digital codes that are transferred to a computer system for further processing, comprising the steps of:

a) periodically sampling of electrical responses that result from the placement of the pointed object upon the digitizing surface, wherein magnitudes of said responses represent the location of said pointed object upon said digitizing surface;

b) converting said electrical responses in an analog-to-digital converter to a set of location digital codes representing the magnitudes of the electrical responses;

c) calculating from said location digital codes, an instantaneous location digital codes representing an instantaneous placement of said pointed object upon said digitizing surface;

d) accepting for processing present instantaneous location digital codes, if the present instantaneous location digital codes have changed from previous instantaneous location digital codes by a magnitude greater than an initial movement threshold to indicate that the pointed object is intended to move;

e) accepting for processing the present instantaneous location digital codes if present instantaneous location digital codes have changed from previous instantaneous location digital codes by a magnitude greater than an intentional movement threshold if the pointed object is moving in a direction that is identical to that when said pointed object traversed the initial movement threshold;

f) accepting for processing the present instantaneous location digital codes if present instantaneous location digital codes have changed from previous instantaneous location digital codes by a magnitude less than an excess difference threshold that indicates the instantaneous location digital codes is to large and not a valid instantaneous location digital codes;

g) if the present instantaneous location digital codes are not accepted for processing, placing the previous instantaneous location digital codes in the filtered instantaneous location digital codes;

h) if the present instantaneous location digital codes are not accepted for processing, placing said present instantaneous location digital codes in the filtered instantaneous location digital codes;

i) converting said filtered instantaneous location digital codes to a protocol acceptable by said computer system;

j) transferring said protocol of the new running average instantaneous location digital codes to said computer system;

k) retaining the current instantaneous location digital codes as the previous instantaneous location digital codes; and l) reiterating the aforementioned steps to create a series of filtered instantaneous location digital codes representing motion of the pointed object upon the digitizing surface.

18. The method of claim 17 further comprising the steps of:

a) examining a pen detect signal that signifies the presence or absence of the pointed object upon the digitizing surface;

b) if the pen detect signal indicates the presence of the pointed object on the digitizing surface, proceeding to the periodic sampling of the electrical responses; and c) if the pen detect signal indicates the absence of the pointed object on the digitizing surface, setting the previous instantaneous location digital codes to the initial value and then proceeding with the periodic sampling.

19. The method of claim 17 further comprising the steps of;

a) examining a pen down indicator means that retains an indication that a current sampling of said absolute location digital codes are a first sampling of the absolute location digital codes;

b) will set said pen down indicator means to a true value if said current sampling of said absolute location digital codes are said first sampling; and c) will place said absolute location digital codes in the previous input register.

20. A method to detect the placement of a pointed object upon a digitizing surface, to filter random vibration and noise from said detected placement, and to create filtered instantaneous location digital codes that are transferred to a computer system for further processing, comprising the steps of:

a) periodically sampling of electrical responses that result from the placement of the pointed object upon the digitizing surface, wherein magnitudes of said responses represent the location of said pointed object upon said digitizing surface;

b) converting said electrical responses in an analog-to-digital converter to a set of location digital codes representing the magnitudes of the electrical responses;

c) calculating from said location digital codes, an instantaneous location digital codes representing an instantaneous placement of said pointed object upon said digitizing surface;

d) if there are no previous running average instantaneous location digital codes, the present instantaneous location digital codes are assigned to previous running average instantaneous location digital codes;

e) calculating a running average instantaneous location digital codes by adding the previous running average instantaneous location digital codes to the present instantaneous location digital codes and dividing a resulting sum by two to create current running average instantaneous location digital codes; and f) placing the current running average instantaneous location digital codes in the filtered instantaneous location digital codes and the previous running average instantaneous location digital codes.

g) converting said filtered instantaneous location digital codes to a protocol acceptable by said computer system;

h) transferring said protocol of the new running average instantaneous location digital codes to said computer system;

i) retaining the current instantaneous location digital codes as the previous instantaneous location digital codes; and j) reiterating the aforementioned steps to create a series of filtered instantaneous location digital codes representing motion of the pointed object upon the digitizing surface.

21. The method of claim 20 further comprising the steps of:

a) examining a pen detect signal that signifies the presence or absence of the pointed object upon the digitizing surface;

b) if the pen detect signal indicates the presence of the pointed object on the digitizing surface, proceeding to the periodic sampling of the electrical responses; and c) if the pen detect signal indicates the absence of the pointed object on the digitizing surface, setting the previous instantaneous location digital codes to the initial value and then proceeding with the periodic sampling.

22. The method of claim 20 further comprising the steps of;

a) examining a pen down indicator means that retains an indication that a current sampling of said absolute location digital codes are a first sampling of the absolute location digital codes;

b) will set said pen down indicator means to a true value if said current sampling of said absolute location digital codes are said first sampling; and c) will place said absolute location digital codes in the previous input register and said running average register.

23. A touchpad digitizing computer input device with noise reduction comprising:

a) a touchpad digitizer having a surface upon which a pointed object is used;

b) a means for providing absolute location digital codes representing a location of the pointed object on the touchpad digitizer;

c) an absolute coordinate threshold filtering means to filter location digital codes to create a filtered absolute coordinate digital codes with remove noise, wherein said filtering means creates a smooth change of position indication:

by accepting for processing present absolute location digital codes, if the present absolute location digital codes have changed from previous absolute location digital codes by a magnitude greater than an initial movement threshold to indicate that the pointed object is intended to move, by accepting for processing the present absolute location digital codes if present absolute location digital codes have changed from previous absolute location digital codes by a magnitude greater than an intentional movement threshold if the pointed object is moving in a direction that is identical to that when said pointed object traversed the initial movement threshold, by accepting for processing the present absolute location digital codes if present absolute location digital codes have changed from previous absolute location digital codes by a magnitude less than an excess difference threshold that indicates the absolute location digital codes is to large and not a valid absolute location digital codes, if the present absolute location digital codes are not accepted for processing, by placing the previous absolute location digital codes in the filtered absolute location digital codes, and if the present absolute location digital codes are not accepted for processing, by placing said present absolute location digital codes in the filtered absolute location digital codes; and d) a means for converting the filtered average digital codes to a touchpad computer interface protocol for transmission to an attached computer system.

24. A touchpad digitizing computer input device with noise reduction comprising:

a) a touchpad digitizer having a surface upon which a pointed object is used;

b) a means for providing absolute location digital codes representing a location of the pointed object on the touchpad digitizer;

c) an absolute coordinate averaging filter means to filter location digital codes to create a filtered absolute coordinate digital codes with remove noise, wherein said filtering means creates a smooth change of position indication:

if there are no previous running average absolute location digital codes, by assigning the present absolute location digital codes to previous running average absolute location digital codes, by calculating a running average absolute location digital codes by adding the previous running average absolute location digital codes to the present absolute location digital codes and dividing a resulting sum by two to create current running average absolute location digital codes, and placing the current running average absolute location digital codes in the filtered absolute location digital codes and the previous running average absolute location digital codes; and d) a means for converting the filtered average digital codes to a touchpad computer interface protocol for transmission to an attached computer system.

\* \* \* \* \*